United States Patent [19]

Jao et al.

[11] Patent Number: 4,973,411
[45] Date of Patent: Nov. 27, 1990

[54] PROCESS FOR THE PREPARATION OF SULFURIZED OVERBASED PHENATE DETERGENTS

[75] Inventors: Tze C. Jao, Fishkill; Carl K. Esche, Wappingers Falls, both of N.Y.; Elzie D. Black, Port Arthur, Tex.; Robert H. Jenkins, Jr., Walkill, N.Y.

[73] Assignee: Texaco Inc., White Plains, N.Y.

[21] Appl. No.: 407,824

[22] Filed: Sep. 15, 1989

[51] Int. Cl.$^5$ ............................................ C10M 105/72
[52] U.S. Cl. ........................................... 252/39; 252/18; 252/33.2; 252/38
[58] Field of Search ..................... 252/38, 39, 18, 33.2

[56] References Cited

U.S. PATENT DOCUMENTS

| | | | |
|---|---|---|---|
| 2,399,878 | 5/1946 | Van Gilder | 252/42.7 |
| 2,406,041 | 8/1946 | Schneider | 252/42.7 |
| 2,409,687 | 10/1946 | Rogers | 260/125 |
| 2,472,517 | 6/1949 | Cantrell | 252/42.7 |
| 2,480,664 | 8/1949 | McNab | 252/42.7 |
| 2,518,379 | 8/1950 | Rogers | 252/42.7 |
| 2,626,207 | 1/1953 | Wies | 44/68 |
| 2,680,096 | 6/1954 | Walker | 252/42.7 |
| 2,695,910 | 11/1954 | Asseff | 252/39 |
| 2,767,209 | 10/1956 | Asseff | 260/504 |
| 2,785,131 | 3/1957 | O'Connor | 252/42.7 |
| 2,800,451 | 7/1957 | O'Mottern | 252/42.7 |
| 2,916,454 | 12/1959 | Bradley | 252/42.7 |
| 3,178,368 | 4/1965 | Hanneman | 252/33.4 |
| 3,336,224 | 8/1967 | Allphin | 252/33.4 |
| 3,367,867 | 2/1968 | Abbott | 252/33.4 |
| 3,377,283 | 4/1968 | McMillen | 252/39 X |
| 3,437,595 | 4/1969 | Coupland | 252/42.7 |
| 3,464,970 | 9/1969 | Sakai | 260/137 |
| 3,493,516 | 3/1976 | Allphin | 252/39 |
| 3,761,414 | 9/1973 | Haugen | 252/42.7 |
| 3,801,507 | 4/1974 | Hendrickson | 252/42 F |
| 3,810,837 | 5/1974 | Chafetz | 252/42 F |
| 3,923,670 | 12/1975 | Crawford | 252/42.7 |
| 3,932,289 | 1/1976 | King | 252/42.7 |
| 3,953,519 | 4/1976 | Hay | 260/609 |
| 3,966,621 | 6/1976 | Watkins | 252/42.7 |
| 3,969,233 | 7/1976 | Lucas | 252/22 |
| 4,016,093 | 4/1977 | Koft, Jr. | 252/42.7 |
| 4,100,085 | 7/1978 | Peditto | 252/42.7 |
| 4,212,752 | 7/1980 | Peditto | 252/42.7 |
| 4,293,431 | 10/1981 | Demoures | 252/39 X |
| 4,302,342 | 11/1981 | Demoures | 252/39 X |
| 4,412,927 | 11/1983 | Demoures et al. | 252/33.3 |
| 4,614,602 | 9/1986 | Valcho | 252/33.3 |
| 4,744,921 | 5/1988 | Liston | 252/427 |

Primary Examiner—Olik Chaudhuri
Assistant Examiner—James M. Hunter, Jr.
Attorney, Agent, or Firm—Robert A. Kulason; James J. O'Loughlin; James K. Poole

[57] ABSTRACT

An improved process for the preparation of sulfurized overbased alkaline earth metal phenates comprises steps of:

(a) sulfurizing an alkylphenol with a sulfur halide in an alkane solvent;
(b) neutralizing the sulfurized alkylphenol with an alkaline earth metal compound in a mixed solvent comprising an alkane and a lower alkanol to produce a sulfurized alkaline earth metal phenate;
(c) carbonating said phenate with carbon dioxide to produce an overbased phenate; and
(d) filtering and solvent stripping the reaction mixture to recover the phenate product.

The products have a high degree of sulfurization with a substantial portion of monosulfide bonds and are substantially free from alkylene oxide residues.

24 Claims, 1 Drawing Sheet

4,973,411

PROCESS FOR THE PREPARATION OF SULFURIZED OVERBASED PHENATE DETERGENTS

BACKGROUND OF THE INVENTION

1. Field of the Invention

This invention relates to additives for lubricating oils, particularly to detergents comprising sulfurized overbased phenates, an oil industry term for compounds which are generally alkaline earth metal alkyl phenolates.

2. Information Disclosure Statement

Sulfurized overbased phenate detergents are a common component used in motor oils. Currently, most of the overbased sulfurized products are manufactured using ethylene glycol. Not only is the process lengthy, but the product also contains undesirable ethylene glycol residue. In the case of the existing processes using methanol solvents, a petroleum sulfonate is required as a co-surfactant to assist in the overbasing of phenates.

U.S. Pat. No. 4,744,921 and British Patent GB 2,197,336 disclose methods for preparing Group II metal overbased sulfurized alkylphenols with elemental sulfur, including the use of a sulfurization catalyst, in solvents containing an inert hydrocarbon, an alkanol of at least 8 carbon atoms and a $C_2$–$C_4$ alkylene glycol. Similarly, the abstract (CA96(26):220373w) of Czech patent CS 190767B discloses a process for preparing lubricating oil additives containing colloidally dispersed $CaCO_3$ by treating alkyl or arylalkylphenolates (also known as phenates) with elemental sulfur and carbonating the product in the presence of $Ca(OH)_2$.

U.S. Pat. No. 4,100,085 describes the use of ammonia or ammonium hydroxide as a promoter in the synthesis of overbased sulfurized alkylphenols. Likewise, U.S. Pat. No. 4,212,752 describes the use of certain amino promoters, such as primary and secondary alkylamines, polyalkyleneamines, amino acids, etc., in the synthesis of overbased sulfurized alkylphenols.

One method of preparing Group II metal overbased sulfurized alkylphenols is described in U.S. Pat. No. 3,178,368 where an alkylphenol, a sulfonate, a high molecular weight alcohol lubricating oil and sulfur are combined and heated with agitation. Hydrated lime is then added, the system heated and ethylene glycol added. Water of reaction is removed, the mixture cooled, and carbon dioxide added. Uncombined $CO_2$ is removed and the reaction vessel is heated to remove ethylene glycol, water and the high molecular alcohol. The product is overbased by the incorporation therein of hydrated lime and carbon dioxide.

U.S. Pat. No. 3,367,867 discloses a similar process to that of U.S. Pat. No. 3,178,368 with the exception that this patent discloses that the use of alkyl groups on the alkylphenol which are mixtures of straight and branched-chained alkyl results in products having suitable viscosities as well as antifoaming properties.

Basic sulfurized calcium alkylphenates are used as compounding agents or additives in lubricating oils to neutralize harmful acids in internal combustion engines and to inhibit corrosion, gum formation and piston ring sticking caused by oxidation of the lubricating oil and oxidative polymerization of the engine fuel residues Metal sulfonates are commonly used in lubricating oil compositions as additives, rust inhibitors and detergents It is highly desirable for such phenates or sulfonates to provide neutralization capacity for acids formed in engine combustion without too rapid a loss in alkalinity. In some cases, these compounding agents or additives are overbased, containing a molar excess of base over that needed to neutralize the phenolic material or sulfonic acid.

A problem associated with the preparation of overbased additive compounds is that of the incompatibility of the mixture of the alkaline earth metal phenate and the sulfonate as a final product The overbased materials, generally an alkaline earth metal compound, e.g. a carbonate, are dispersed by the phenate and/or sulfonate surfactant in the alkaline earth metal dispersing agent (i.e., the oil), the amount of dispersed alkaline earth metal being known as the overbased amount. Since the greater the basicity of the material the better, as this allows smaller amounts of the material to be used for a given effect in a lubricant, a greater degree of overbasing is highly desirable. However, to increase basicity, it is generally necessary to increase the dispersed alkaline earth metal content of the carbonate complex. The incompatibility problems of the phenate and sulfonate components are generally exacerbated by greater degrees of overbasing.

Overbased phenates, including sulfurized phenates, are commonly manufactured in the presence of ethylene glycol which must be removed from the product. The presence of glycol in overbased phenates can cause engine varnish or lacquer. Phenates are generally the reaction product of phenol or substituted phenol with a metal or ammonium base. Often the metal base is a Group II metal compound. Substituted phenols are generally mono-, di- or tri-hydrocarbyl substituted, such as alkyl, alkenyl, aryl, arylalkyl, or alkylaryl. The hydrocarbyl groups can comprise low molecular weight groups such as methyl, ethyl, the isomers of propyl, butyl, pentyl, hexyl, heptyl, octyl, nonyl, decyl and the like up to high molecular weight materials having a number average molecular weight of 1000 or more. These hydrocarbyl substituents can be intermediate molecular weight polymer olefins such as $C_8$–$C_{100}$ ethylene or propylene or butylene polymers The hydrocarbyl can be substituted with groups such as chlorine, bromine, hydroxy, nitro or sulfonic acid groups so long as such substitution does not interfere with the utility of the composition. The Group II metal compound can comprise a metal oxide, hydroxide, alcoholate, acetate and the like. Common metals are calcium, barium, strontium and magnesium. Often, the metal compound is calcium oxide or hydroxide. Phenates can contain sulfur which can be introduced by the reaction of elemental sulfur or $SCl_2$ with phenol or substituted phenols, or by the reaction of elemental sulfur or $SCl_2$ with metal phenates.

Methods of making these various phenates and sulfur-containing phenates and overbasing can be found in U.S. Pat. Nos. 2,680,096; 3,036,971; 3,178,368; 3,336,224, 3,437,595; 3,464,970; 3,761,414; 3,801,507; 3,810,837; 3,923,670; 3,932,289; 3,953,519; 3,966,621 and 3,969,233.

Oil soluble overbased sulfonates are made by reacting a base with oil-soluble sulfonic acids. Suitable oil-soluble sulfonic acids can be aliphatic or aromatic compounds. Suitable aromatic sulfonic acids are the oil-soluble petroleum sulfonic acids, commonly referred to as "mahogany acids," aryl sulfonic acids, and alkylaryl sulfonic acids. Illustrative of such sulfonic acids are dilauryl benzene sulfonic acid, lauryl cetyl benzene sulfonic acid, paraffin-substituted benzene sulfonic acids, polyolefin alkylated benzene sulfonic acids, such as polybutylene alkylated benezene sulfonic acids in which the polybutylene substituents have a molecular weight within the range of from about 100 to about 1000 and polypropylene alkylated benzene sulfonic acids in which the polypropylene substituents have a molecular weight within the range of from about 80 to about 1000. Examples of other suitable sulfonic acids are alpha-olefin benzene sulfonic acids, diparaffin wax-substituted phenol sulfonic acids, acetylchlorobenzene sulfonic acids, cetyl-phenol disulfide sulfonic acids, cetyl-phenol monosulfide sulfonic acids, and cetoxy capryl benzene sulfonic acids. Other suitable oil-soluble sulfonic acids are well described in the art, such as, for example U.S. Pat. No. 2,616,604; U.S. Pat. No. 2,626,207; and U.S. Pat. No. 2,767,209; and others.

Non-aromatic sulfonic acids are generally made by the sulfonation of any suitable aliphatic hydrocarbon such as alkanes, alkenes, and the like. Also, the hydrocarbyl groups may contain various substituents which do not interfere with later reactions or end use. One preferred group of non-aromatic sulfonic acids is made by the sulfonation of polymers, or copolymers, such as polymerized or copolymerized olefins.

The term "polymer olefins" as used herein refers to amorphous polymers and copolymers derived from olefinically unsaturated monomers. Such olefin monomers include olefins of the general formula $RCH=CH_2$, in which R comprises hydrogen or an aliphatic or cycloaliphatic group of from 1 to about 20 carbon atoms, for example, propene, isobutylene, butene-1, 4-methyl-1-pentene, decene-1, vinylidene, norbornene, 5-methylene-2-norbornene, etc. Other olefin monomers having a plurality of double bonds may be used, in particular diolefins containing from about 4 to about 25 carbon atoms, e.g., 1,4-butadiene, 2,3-hexadiene, 1,4-pentadiene, 2-methyl-2,-5-hexadiene, 1,7-octadiene, etc. These polyolefins have number average molecular weights from about 36 to about 1000. Of these materials, a preferred group is polyethylene or polypropylene or polybutylene polymers. The olefin may be a copolymer, such as an ethylene propylene copolymer or ethylene-propylene-hexadiene terpolymer, or others.

The preparation of the sulfonic acids is well known. Such sulfonic acids can be prepared by reacting the material to be sulfonated with a suitable sulfonating agent, such as concentrated sulfuric acid, fuming sulfuric acid, chlorosulfonic acid or sulfur trioxide for a period of time sufficient to effect sulfonation, and thereafter separating insoluble acid sludge from the oil-soluble sulfonic acid. Overbased sulfonates are commonly made by the reaction of sulfonic acid with metal bases such as the oxide or hydroxide of calcium, magnesium or barium. In some cases, the sulfonate can be made from the metal itself or a derivative of said metal. Suitable processes for making overbased sulfonates are described in U.S. Pat. Nos., 3,126,640; 3,492,230; 3,524,814; and 3,609,076.

U.S. Pat. No. 4,412,927 teaches the preparation of detergent-dispersant compositions useful as additives for lubricating oils having a base of alkylbenzene sulfonates and sulfurized alkylphenates. The process employs sulfurized alkylphenates, alkaline-earth metal alkylbenzene sulfonates, alkylene glycols and carbon dioxide. The process requires carbonating at a temperature between about 100° C. and 250° C., a reaction medium comprising a sulfurized alkylphenate of an alkaline earth metal of a total basic number (TBN) (ASTM Standard D-2896) of between 0 and 170, the said alkylphenate having one or more $C_6$-$C_{60}$ alkyl substituents, an alkaline earth metal alkylbenzene sulfonate of a molecular weight of more than about 300 and a TBN of less than or equal to about 150, an alkaline earth metal compound, an alkylene glycol and a diluent oil. The alkylene glycol is subsequently removed and the metallic detergent-dispersant is separated.

As is well-known, calcium phenates having TBN's of 80–250 tend to interact with low and high base sulfonates to produce haze and sediment when blended into crankcase oils. This phenate-sulfonate incompatibility can be influenced by the components in a finished oil. For example, the simultaneous presence of zinc dialkyldithiophosphate (ZnDTP) and water can aggravate the phenate-sulfonate interaction. Many finished oils contain ZnDTP. This phenate-sulfonate incompatibility is worsened when the finished oil contains a small amount of water, as can happen during handling and storage.

It has long been known, as evidenced by the preceding recital of the prior art, i.e., U.S. Pat. No. 4,412,927, that an overbased metallic detergent-dispersant can be prepared by carbonating a sulfurized alkylphenate of an alkaline earth metal having a TBN of between 0 and 170 (i.e., generally from about 80 to 170) with a cosurfactant such as an alkaline-earth metal alkylbenzene sulfonate having a molecular weight of more than 300 and a TBN of less than or equal to 150, an alkaline-earth metal compound, an alkylene glycol and a diluent oil. The resulting product requires removal of the alkylene glycol which can waste raw materials. Incomplete removal of the alkylene glycol can cause engine varnish.

In addition to the polyalkylene glycols commonly used in processes for the preparation of overbased sulfurized phenates, numerous other solvents or mixtures thereof have been used in the various stages of such processes. For example, U.S. Pat. No. 4,016,093 discloses the use of solvents including various combinations of mineral oil, monochlorobenzene and methanol for different stages of the processes. U.S. Pat. No. 3,933,289 discloses the use of $C_1$ to $C_3$ alkanols as the solvent for a process in which a magnesium alkoxide is formed, carbonated, sulfurized with elemental sulfur and then overbased. U.S. Pat. No. 2,916,454 discloses the use of benzol (benzene) as the solvent for sulfurization of alkylphenols with sulfur dichloride.

U.S. Pat. No. 2,785,131 discusses the use of low-boiling solvents including carbon disulfide, ethylene dichloride and hexane, and discloses the use of saturated mineral lube oils in the absence of such solvents for the sulfurization of alkylphenols with sulfur chlorides. In U.S. Pat. Nos. 2,518,379 and 2,480,664 the process of overbasing alkylated phenols which have been sulfurized with sulfur is reportedly improved by the addition of higher alcohols (such as stearyl, lauryl or cetyl) to the mineral oil solvent. U.S. Pat. No. 2,406,041 discloses the use of mineral oil solvents containing higher aliphatic alcohols or aliphatic nitriles.

U.S. Pat. No. 2,472,517 discloses the process of sulfurizing alkylphenols with sulfur dichloride in solvents such as aromatic or aliphatic hydrocarbons, carbon tetrachloride or chloroform. U.S. Pat. No. 2,399,878 discloses the use of solvents such as dichloroethane, chloroform, petroleum naphtha and benzol (benzene) in the sulfurizing of alkylphenols with sulfur dichloride. U.S. Pat. No. 2,800,451 discloses processes including the sulfurization of alkylphenols with sulfur dichloride in a solvent including hexane and a mixture of $C_{10}$-$C_{18}$ alcohols.

U.S. Pat. No. 4,614,602 discusses various processes for producing overbased sulfurized phenates and discloses processes for reacting a sulfurized alkaline earth metal phenate with an alkaline earth metal alkylbenzene sulfonate in a "co-synthesis reaction" in the presence of a $C_1$-$C_4$ alcohol In Example XXX, a mixture of xylenes and methanol is used as the solvent in the neutralization and overbasing steps.

None of the patents discussed above suggest that it would be advantageous to employ mixed solvents comprising aliphatic hydrocarbons and lower alkanols in the overbasing of metal phenates which have been sufurized with sulfur halides.

SUMMARY OF THE INVENTION

An object of this invention is a simplified process for the preparation of overbased sulfurized alkylphenates which does not require the use of alkylene glycols such as ethylene glycol or surfactants such as petroleum sulfonates Another object of the invention is an overbased alkylphenate product which is substantially completely sulfurized and stable in a lubricating oil composition These and other objects will become apparent from the following description, the figure and the appended claims A novel process which can advantageously use an alkylphenol as the starting material, a sulfur halide such as $SCl_2$ as the sulfurizing agent and a mixed alkanol/alkane (e.g. methanol/heptane) as the neutralizing and overbasing medium has been developed. Four steps are generally involved in this process: (1) sulfurization of an alkylphenol in an alkane such as heptane with $SCl_2$, (2) neutralization of the sulfurized alkyl phenol in a solvent medium composed of a mixture of a lower alkanol and an alkane such as methanol and heptane, (3) carbonation of the neutralized and sulfurized alkylphenol, and (4) filtration and solvent stripping. The processing time is shorter than that of the known ethylene glycol process. Surprisingly, the product gives better diesel engine performance when included in the engine lubricating oil as an additive.

The new process differs from the existing methanol processes in that no petroleum sulfonate is needed as the co-surfactant and that $SCl_2$ is used as the sulfurizing agent instead of elemental sulfur. It is different from the ethylene glycol process in that no ethylene glycol is used and that a $C_6$-$C_{10}$ alkane such as heptane or isooctane is used as the solvent in the sulfurizing step, while a mixed alkane-alkanol solvent is used in the neutralization and/or overbasing steps.

In accordance with the present invention, the novel process of preparing sulfurized overbased alkaline earth metal phenates comprises steps of:

(a) sulfurizing an alkylphenol with a sulfur halide in an alkane solvent;

(b) neutralizing the sulfurized alkylphenol with an alkaline earth metal compound in a mixed solvent comprising an alkane and a lower alkanol to produce a sulfurized alkaline earth metal phenate;

(c) carbonating said phenate with carbon dioxide to produce an overbased phenate in a reaction mixture; and (d) filtering and solvent stripping the reaction mixture to recover the phenate product.

In various embodiments of the invention the starting feedstock can be an alkylphenol, sulfurized alkylphenol, or neutralized sulfurized alkylphenol, i.e. a neutralized sulfurized alkylphenate, permitting the selection of the most economical feedstock, so long as at least a step of overbasing by carbonation in the mixed solvent medium as described above is included.

Further in accordance with the invention, sulfurized overbased alkaline earth metal phenates provided by the novel process are provided. These products achieve a high degree of sulfurization (generally at least about 90 percent and preferably up to about 99 percent), and are substantially free of the alkylene glycols or residues thereof which are frequently present in prior art products. Still further in accordance with the invention, lubricating compositions comprising a major proportion of a lubricating oil composition and a minor proportion of the sulfurized overbased alkaline earth metal phenates of the invention are provided.

The new process uses a sulfur halide such as $SCl_2$ as the sulfurizing agent, which results in more efficient sulfurization (see Table II) and shorter processing time (see Table I). Surprisingly, it produces a product that gives better diesel engine performance (see Table III).

DETAILED DESCRIPTION OF THE INVENTION

Figure 1:
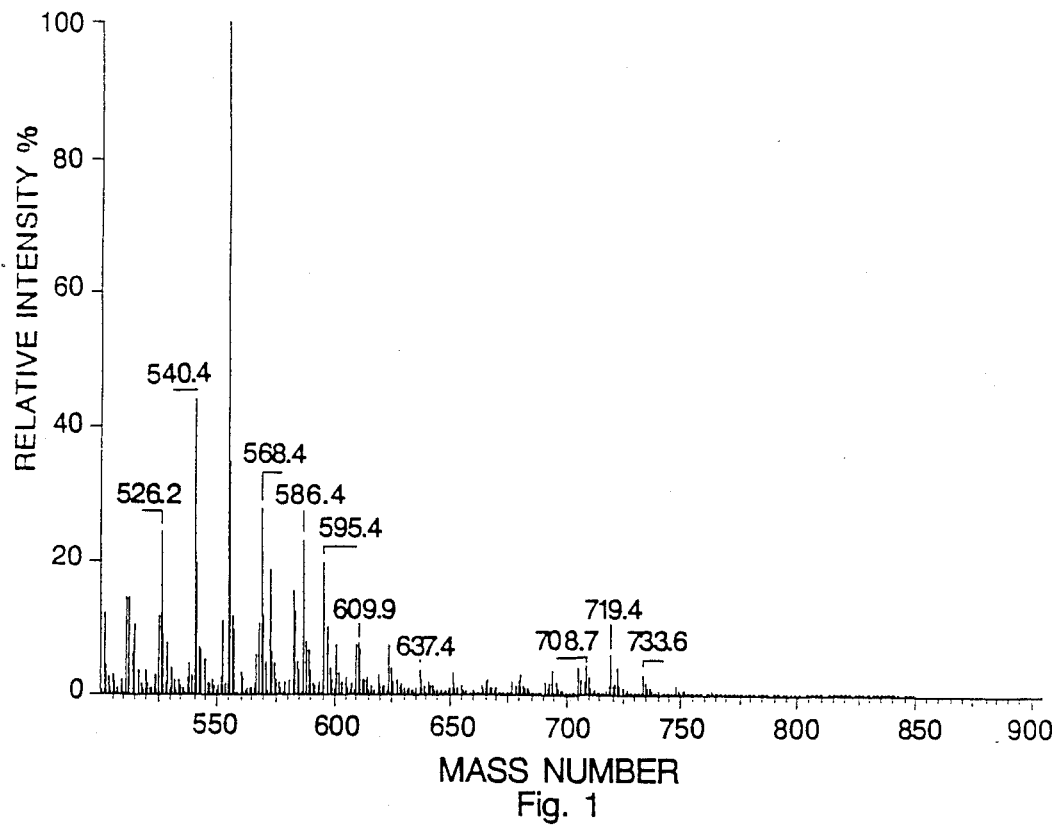
FIG. 1 is a mass spectrogram of a sulfurized overbased phenate produced with $SCl_2$ in accordance with the invention, and demonstrates the high proportion of monosulfide bonding (—S—) achieved compared with disulfide (—S—S—) bonding.

In the methods of this invention, the recited process steps are carried out using techniques similar to those previously described in the art. The use of a lower alkanol such as methanol in an alkane solvent for the neutralization and/or overbasing steps appears to act as a promoter for neutralization and/or carbonation, resulting in numerous advantages. Since alkylphenols and phenates may form micellar complexes either together or with alkali and alkaline earth metal compounds, it is believed that the alkanols employed in the solvents of the present invention facilitate the process steps of neutralization and carbonation by at last partially breaking up the micelles. The use of sulfur dihalides such as $SCl_2$ has been found to produce more complete sulfurization of the phenols than obtained with prior art methods of employing elemental sulfur, resulting in fewer non-sulfurized phenol molecules, and the preferential formation of monosulfide bonds between the phenol units The proportions of monosulfide bonding produced may vary with the purity of the $SCl_2$ reagent employed in the reaction, since industrial grades of $SCl_2$ contain minor proportions of $S_2CL_2$, a species which could contribute to disulfide bonding While not wishing to be bound by theory, these monosulfur bonds are expected to make the phenols easier to neutralize, based upon the electronegative effects of the sulfur atoms on the phenol rings and the resultant weakening of the hydroxyl bonds. Applicants are not aware of any literature suggesting that the use of $SCl_2$ in such reactions would produce a higher degree of sulfurization. Increasing the degree of sulfurization of overbased sulfurized alkylphenols has previously been recognized as desirable; see U.S. Pat. No. 4,744,921.

The alkylphenol employed in this invention as a feedstock is represented by formula I:

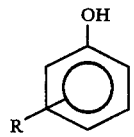
(I)

wherein R is an alkyl group containing a sufficient number of carbon atoms to render the resulting Group II metal overbased sulfurized alkylphenate oil-soluble, generally at least 7 carbon atoms. Preferably, R is alkyl wherein from about 25 to 100 mole percent of the alkyl group is straight-chain or branched alkyl of from 7 to 25 carbon atoms and from about 75 to 0 mole percent of the alkyl group is polypropenyl of from 9 to 18 carbon atoms, although more preferably R is alkyl wherein from about 35 to 100 mole percent of the alkyl group is straight chain or branched of from 8 to 17 carbon atoms and from about 65 to 0 mole percent of the alkyl group is polypropenyl of from 9 to 18 carbon atoms. The use of increasing amounts of predominantly straight chain alkyl results in high TBN products generally characterized by lower viscosities. On the other hand, while polypropenylphenols are generally more economical than predominantly straight chain alkylphenols, the use of greater than 75 mole percent polypropenylphenol in the preparation of Group II metal overbased sulfurized alkylphenolates is generally expected to result in products of relatively high viscosities. However, the use of a mixture of from 75 mole percent or less of polypropenylphenol of from 9 to 18 carbon atoms and from 25 mole percent or more of predominantly straight chain alkylphenol of from 7 to 25 carbon atoms generally allows for more economical products of acceptable viscosities. In general, the use of alkylphenols in which R has a lower carbon number produces products of higher viscosity, while the use of alkylphenols in which R has a higher carbon number leads to lower viscosity products, given the same general overbasing level. The presently preferred alkylphenols comprise dodecylphenol, and preferably consist essentially of dodecylphenol.

The alkylphenols of Formula I above can be prepared by methods similar to those described in U.S. Pat. No. 4,744,921, which is incorporated herein by reference.

The alkylphenols employed in this invention are generally either ortho alkylphenols of the formula:

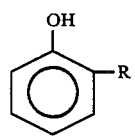
(II)

or para-alkylphenols of the formula:

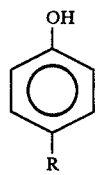
(III)

Preferably, R is predominantly para, with no more than about 50 mole percent of the R alkyl group being in the ortho position; and more preferably no more than about 35 mole percent of the alkyl group being in the ortho position. It is believed that p-alkylphenols, III, facilitate the preparation of highly overbased Group II metal sulfurized alkylphenols and alkylphenates. Such materials can be prepared as described in U.S. Pat. No. 4,744,921 and are commercially available from Texaco Inc.

The alkylphenol is sulfurized using a sulfur halide such as sulfur chloride or dichloride, preferably the latter. Although any suitable sulfur halide (preferably a dihalide) selected from the chlorides, bromides, iodides and fluorides can be used, the chlorides are preferred due to their economical availability. Sulfur dichloride is particularly preferred because it produces a substantially completely sulfurized phenate product with a high proportion of monosulfide bonds (—S—) including a single sulfur atom versus disulfide bonds (—S—S—), as discussed below. Therefore, the sulfur halide reagent to be employed preferably consists essentially of sulfur dichloride.

In the sulfurizing step, the molar proportions of the sulfur halide to the alkylphenol can be in the range of from about 0.1:1 to about 0.9:1, preferably from about 0.3 to 0.7:1, and most preferably from about 0.5 to 0.7:1. The sulfur halide should be present in molar proportions to the alkylphenol sufficient to produce substantially complete sulfurization of the alkylphenol. For purposes of this application, the degree of sulfurization is defined as the proportion of the alkylphenols which are bonded to another alkylphenol via sulfide bonding in at least one of the available sites, taken from the vacant ortho positions (i.e., two in the para-alkylphenols shown in formula III above, and one in the ortho-alkylphenols of formula II).

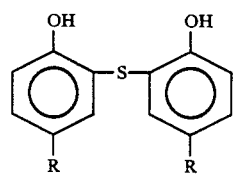
(IV)

Thus, with complete (100 percent) sulfurization, there are no non-sulfurized alkylphenols present. By sulfurization, it is meant that at least one unsubstituted position of the alkylphenol is bonded by a sulfur to another alkylphenol. It should be noted that the mere proportions of sulfur bonded to the alkylphenols are insufficient to determine the degree of sulfurization, since some of the alkylphenols may have sulfur bonded to more than one site and since disulfide bonding may take place (Formula V) rather than the monosulfide bonding of Formula IV.

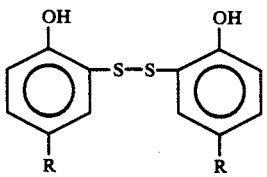

(V)

An advantage of the present invention is that a high degree of sulfurization of the alkylphenols can be attained while also producing a high proportion of monosulfide bonds relative to disulfide bonds. Sulfurized alkylphenols containing disulfide bonds are less stable than those containing only monosulfide bonds, due to the relative weakness of the S—S bonds compared to S—C bonds.

The primary solvent for the reaction steps of this invention is an alkane having from about 6 to about 10 carbon atoms, preferably 7 or 8 carbon atoms. The alkane can be linear, cyclic or branched Heptane and isooctane are presently preferred. The molar proportions of the solvent to the alkylphenol can be in the range of from about 3:1 to about 15:1, preferably from about 6:1 to about 12:1.

Admixed with the alkane solvent in at least neutralization and overbasing steps is a lower alkanol from 1 to 3 carbon atoms as a promoter. Any suitable alkanol, linear or branched, within this class can be used, but methanol is presently preferred. The alkanol is used in molar proportions to the alkane solvent in the range of from about 0.1:1 to about 0.8:1, preferably from about 0.3 to 0.6:1, and most preferably from about 0.3 to 0.5:1.

The sulfurized alkylphenol is neutralized with an alkaline earth (Group II) metal compound, e.g. a Group II metal oxide, hydroxide or $C_1$-$C_6$ alkoxide.

The Group II metal oxide, hydroxide or $C_1$-$C_6$ alkoxide used to prepare the Group II metal alkylphenol includes the oxides, hydroxides and alkoxides of calcium, strontium, barium or magnesium. However, calcium, barium and magnesium are preferred whereas calcium is most preferred. The Group II metal oxide, hydroxide, or $C_1$-$C_6$ alkoxide is employed at a molar ratio to the alkylphenol of from about 1 to about 4:1, although preferably from about 1.2 to about 3, and even more preferably from about 1.2 to about 2.5:1.

Carbon dioxide is added to the reaction system in conjunction with the group II metal oxide, hydroxide or $C_1$-$C_alkoxide$ to form overbased products and is generally employed from about 0.5 to about 3 moles per mole of alkylphenol, preferably from about 0.5 to about 2 moles per mole of alkylphenol charged to the reaction system. Preferably, the amount of $CO_2$ incorporated into the Group II metal overbased sulfurized alkylphenolate is such that the $CO_2$ to group II metal base mole ratio is in the range of from about 0.5 to about 0.9:1.

To further illustrate the large number and variety of classes of alkaline earth metal compounds which can be employed, specific examples thereof are enumerated below.

The alkaline earth metal compounds include the barium-containing compounds such as barium hydroxide, barium oxide, barium sulfide, barium bicarbonate, barium hydride, barium amide, barium chloride, barium bromide, barium nitrate, barium sulfate, barium borate, etc.; the calcium-containing compounds such as calcium hydroxide, calcium oxide, calcium sulfide, calcium bicarbonate, calcium hydride, calcium amide, calcium chloride, calcium bromide, calcium nitrate, calcium borate, etc.; the strontium-containing compounds such as strontium hydroxide, strontium oxide, strontium sulfide, strontium bicarbonate, strontium amide, strontium nitrate, strontium hydride, strontium nitrite, etc.; the magnesium-containing compounds such as magnesium hydroxide magnesium oxide, magnesium bicarbonate, magnesium nitrate, magnesium nitrite, magnesium amide, magnesium chloride, magnesium sulfate, magnesium hydrosulfide, etc. The corresponding basic salts of the above-described compounds are also intended; however, it should be understood that the alkaline earth metal compounds are not equivalent for the purposes of the present invention, because under certain conditions some are more effective or desirable than others. The calcium salts are presently preferred, particularly calcium oxide, calcium hydroxide and mixtures thereof.

The reaction to prepare the sulfurized overbased alkaline earth metal alkylphenates is conducted by the following steps.

First, incorporating into an alkane solvent as described an alkylphenol wherein the alkyl group contains a sufficient number of carbon atoms to render oil-soluble the resulting phenate product. The desired amount of the sulfur halide is slowly added to the reaction mixture at room temperature while nitrogen gas is bubbled through. The mixture is stirred, heated to 80° C. for approximately one half hour, then cooled to 45° C. The alcohol and an inert hydrocarbon diluent such as 100P pale oil are added, together with the alkaline earth compound, the nitrogen gas is stopped and the mixture is stirred for about one hour at a temperature of about 55°-57° C. to neutralize the phenol. The resulting phenate is carbonated by bubbling $CO_2$ through the mixture for at least one hour at the same temperature. The resulting crude product is filtered, after which the solvent is stripped at approximately 100° C. under vacuum.

As discussed above and illustrated in the examples, the process of the present invention produces phenates which are substantially completely sulfurized and substantially free of the alkylene glycols or residues thereof which are encountered in most prior art processes. By complete sulfurization, it is meant that each alkylphenol is bonded to at least one other alkylphenol via sulfide bonding and thus no free (i.e. unsulfurized) phenol remains in the reaction mixture. Using the claimed process of sulfurizing with a sulfur halide such as $SCl_2$ and an alkane solvent the degree of sulfurization attained can be at least about 90 percent of the available alkylphenol molecules, preferably at least about 95 percent, and most preferably about 99 percent. This increased degree of sulfurization compared to prior art products is believed to contribute to the increased thermal and oxidative stability of the phenates of the present invention in use, as illustrated by the engine test described in Example V. Furthermore, as discussed in U.S. Pat. No. 4,614,602, Col. 2, the presence of glycols in overbased phenates can cause engine varnish; the avoidance of such residues is an advantage of the present invention. An additional advantage is that cosurfactants or promoters such as petroleum sulfonates need not be employed in the overbasing process. This facilitates the overbasing process, since petroleum sulfonates if present would preferentially absorb the basic species employed in overbasing, impeding the overbasing reaction with the phenates.

EXAMPLES

The following examples are presented to illustrate specific embodiments of the practice of this invention and should not be interpreted as limitations upon the scope of the invention. Unless otherwise specified, all proportions are expressed as parts by weight. As used herein the term "Total Base Number" or "TBN" refers to the amount of base equivalent to milligrams of KOH in 1 gram of sample (ASTM Standard D-2896). Thus, higher TBN numbers reflect more alkaline products and therefore a greater alkalinity reserve.

EXAMPLE I

A sulfurized phenate product was prepared by the following procedure:

Charge 192 parts of dodecylphenol by weight into a 3-liter four neck reaction flask, plus 840 parts of isooctane or heptane. Bubble nitrogen gas through the mixture at a rate of 400 ml/min. Slowly add 51 parts of $SCl_2$ via an addition funnel to keep the reaction temperature close to room temperature. Stir the reactants for 5 minutes and then heat the reaction to 80° C. for half an hour. Cool the reactants to 45° C. Add 216 parts of 100 P pale oil, plus 115 parts of methanol, and 105 parts of $Ca(OH)_2$; stop the nitrogen gas, and stir for one hour at 55°–57° C. Maintain the temperature and start $CO_2$ bubbling at an appropriate rate between about 200–300 ml/min for approximately 77 minutes. An appropriate rate of $CO_2$ flow is one which permits attainment of the desired ration of $CO_2$ reacted with metal base as reflected by TBN and quantitative analysis for $CO_2$. Filter the crude product and then strip the solvent at approximately 100° C. under vacuum. The pale oil is hydrofinished pale stock, 100 SUS at 40° C., contains 100 percent solvent-dewaxed heavy paraffinic petroleum distillates, and is commercially available from Texaco Inc. The $SCl_2$ reagent employed was a technical grade obtained from Aldrich Chemical Co. (Cat. No. 33,032-9) containing approximately 80 weight percent $SCl_2$, the major impurity being $S_2Cl_2$. The $CO_2$ flow rate employed was 275 ml/min.

The final product contained 8.04 weight percent total Ca, 3.65 weight percent S, a TBN of 217.1 and a kinematic viscosity at 100° C. of 90.98 cSt. Elemental analysis for Ca and S was carried out by X-ray fluorescence spectroscopy.

EXAMPLE II

A blend of 136 parts of sulfurized dodecylphenol in 100 P pale oil, plus 38.4 parts methanol, plus 280 parts of n-heptane, plus 35.1 parts calcium hydroxide was brought to 55° C. in a 1-liter flask and kept at that temperature for 60 minutes. $CO_2$ was bubbled through the reactants at a rate of about 100 ml/min. The treatment of $CO_2$ was stopped at 77 minutes after the $CO_2$ addition had started.

A filtered and solvent stripped product was obtained which was clear. The product contained 7.54 weight percent total Ca and 3.5 weight percent sulfur, had a TBN of 206, and a kinematic viscosity of 97.3 cSt at 100° C.

EXAMPLE III

A blend containing 53.2 parts of a neutral sulfurized calcium phenate by weight, plus 87 parts n-heptane, plus 12.3 parts methanol, plus 10.9 parts calcium hydroxide was brought to reflux (62° C.) in a 500 ml 4-neck reaction flask. $CO_2$ was then introduced into the reaction mixture at a rate of 40 ml/min. due to the smaller vessel. The $CO_2$ treatment was stopped at 60 minutes after the $CO_2$ addition had started. At the end of the reaction, 14.5 parts pale oil was added and stirred for an additional 10 minutes.

The filtered and solvent stripped product was clear and had a TBN value of 200. The infrared spectrum showed that it was an acceptable product.

A comparison of the time required to produce equal quantities of an overbased sulfurized phenate product from comparable starting materials by the process of the present invention versus a typical prior art process employing ethylene glycol is shown in Table I. It is apparent that the time shown for the inventive process is significantly shorter for all but the filtering step, and the increased filtration rate for the inventive process would make this time shorter as well.

A further advantage of the inventive process is that since ethylene glycol or similar material is not used, the glycol residues which are present as at least about 0.3 weight percent of the product with prior art processes and can cause various problems as described above are not encountered.

TABLE I

Comparison between Ethylene Glycol Process and Inventive (Methanol)[1] Process for Making Overbased Sulfurized Phenate

|  | Ethylene Glycol Process | Methanol Process |
|---|---|---|
| Sulfurization and neutralization time | 4 hrs | 3.75 hrs |
| Overbasing time | 3.5 hrs | 2.5 hrs |
| Relative filtration rate | 1 | 1.35 |
| Stripping time | 10 hrs | 7.5 hrs |
| Total Time | 17.5 hrs | 13.75 hrs |
| Ethylene glycol residue | >0.3 wt % | none |

[1]Comparison is made on the basis of equal quantity of the final product produced.

EXAMPLE IV

To illustrate the greater sulfurization efficiency available with the present invention as compared to the conventional prior art processes employing ethylene glycol and elemental sulfur, a sulfurized, neutralized phenate was isolated from a reaction mixture containing dodecylphenol, sulfur, calcium hydroxide and ethylene glycol in mole ratios of 1:1:0.6 0.4. The reaction was carried out for four hours at approximately 169° C., followed by partial carbonation. Pale oil (100P) was added to give a 50 weight percent concentrate, and the phenate was tested for sulfurization by composition analysis. Infrared analysis indicated the presence of sulfurized alkyl phenates and gylcolates.

A comparable sulfurized phenate intermediate was isolated from an inventive process as in Example I after completing the sulfurization and neutralization steps but before carbonation/overbasing. Pale oil was added to provide a 50 weight percent concentrate. Infrared analysis indicated the presence of sulfurized alkyl phenates.

To determine the degree of sulfurization, the products were dialyzed with finger cot latex membranes, which retained the calcium sulfurized alkyl phenates. The dialyzates were further separated by liquid column chromatograph using Florisil silica gel from Floridan as the absorbent. The amounts of the various sulfurized alkylphenols were determined gravimetrically. The results are set forth in Table II.

TABLE II

| Composition (wt %) | Process | |
|---|---|---|
| | Elemental Sulfur with Ethylene Glycol | Sulfur Dichloride |
| Mineral Oil | 53 | 52.5 |
| Di-tri-alkyl phenols | 4.5 | — |
| Monoalkylphenols | 4 | — |
| Sulfurized alkylphenols | 2.5 | 18.5 |
| Calcium sulfurized alkyl phenates | 36[1] | 29 |

[1]Contains calcium salts of ethylene glycol.

As shown in TABLE III, the percentage of sulfurization attained using the inventive method was 99 percent, compared with only 79 percent for the prior art process employing ethylene glycol and elemental sulfur. The inventive products thus represents the optimum degree of and oxidative stability of the additives and the lubricating oil compositions in which they are used.

TABLE III

Comparison of Sulfurization Efficiency between Using $SCl_2$ and Elemental Sulfur as Sulfurizing Agents

| | $SCl_2$ | Elemental Sulfur |
|---|---|---|
| Percent of Sulfurization | 99 | 79 |

FIG. 1 is a mass spectrogram of a sulfurized dodecylphenol prepared in accordance with Example I using 0.5 mole $SCl_2$ per mole of alkylphenol obtained by a direct exposure probe technique using a Finnigan Mat Model TSQ-70:

The results obtained with 0.66 mole $SCl_2$ were similar.

The principal peak at molecular weight 554.4 represents the desired product

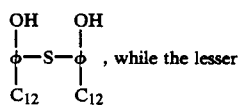, while the lesser peak at molecular weight 586.3 represents the corresponding disulfide (—S—S—) bonded species. Approximate calculations based upon the relative intensities of these single principal peaks for each species indicate that the disulfide-bonded species are present in amounts of approximately 20–25 mole percent of the principal monosulfide-bonded product. (Additional sulfide bonded species of both types are also represented in minor amounts). In other words the relative amount of disulfide-bonded species of both types was only one fifth to one fourth that of the monosulfide-bonded species. The proportion of monosulfide bonding could be increased by using $SCl_2$ reagents containing higher proportions of $SCl_2$. Thus, using the process of the present invention, sulfurized alkylphenols (and the corresponding phenates) can be prepared in which the sulfide bonding is substantially monosulfide bonding, i.e. at least about 70 percent monosulfide bonding. Preferably, the sulfide bonding is at least 80 percent monosulfide bonding, and most preferably at least about 90 percent monosulfide bonding.

Figure 2:
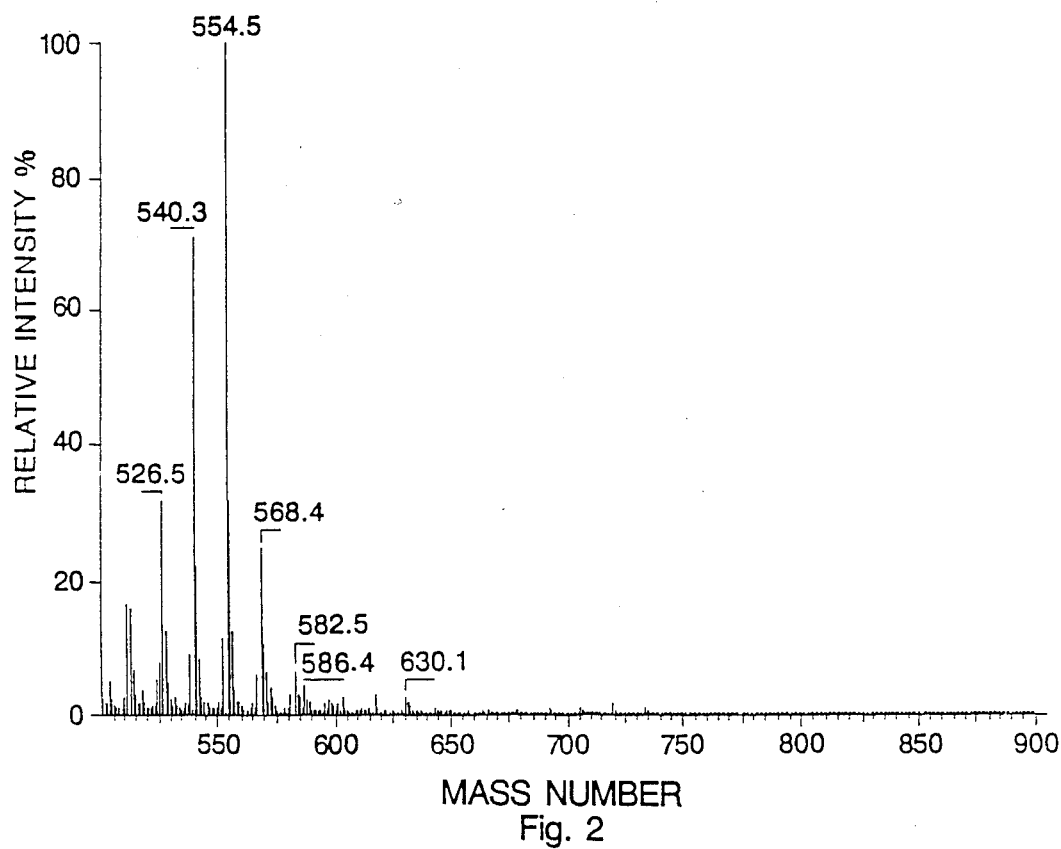
FIG. 2 is a mass spectrogram of a sulfurized overbased phenate produced with elemental sulfur in the presence of an alkylene glycol as a comparative example.

FIG. 2 is a mass spectrogram of a sulfurized dodecylphenol prepared by the prior art process employing ehtylene glycol, as discussed above, with 0.5 mole $SCl_2$ per mole dodecylphenol. The same mass spectrograph and procedures were used as for FIG. 1. A similar comparison of the peaks at molecular weights 554.5 and 586.4 (representing the monosulfide and disulfide bonds, respectively) indicates that the disulfide bonding amounts to approximately 5 percent of the monosulfide bonding. Sulfurized alkylphenates containing higher proportions of monosulfide bonding are generally expected to be more stable; thus, it is surprising that the phenates of the present invention outperformed phenates prepared by prior art processes and having higher proportions of monosulfide bonding in the engine performance tests of Example V.

EXAMPLE V

To compare the actual performance as lubricating oil additives of the sulfurized phenates of the present invention and comparable products prepared by prior art processes employing ethylene glycol and elemental sulfur, lubricating oil compositions were made up using two comparative additives prepared as in Example IV and an inventive additive prepared as in Example I. These oil compositions were performance tested in a diesel engine in accordance with the MWM-B test, described in CEC-L-12A-76 (Coordinating European Committee for the Development of Performance Tests for Lubricants and Engine Fuels) and DIN (German Insitute for Standardization) 51361 (part 4). This test involves running the engine for 50 test hours to evaluate the oil's effect on ring sticking, wear and accumulation of deposits under high temperature conditions. As shown in TABLE IV, the oil composition containing the inventive additive produced a merit rating better than "good," while the compositions containing prior art additives produced ratings which could be described as mediocre. This improved performance using the inventive additives represents a significant increase which could be expected to be commercially important.

While not wishing to be bound by theory, the improved engine performance is believed to be due to the combined effects of the substantially complete sulfurization of the overbased phenates of the invention, the absence of alkylene glycol residues therein, and the apparent different micellar association of the overbased phenate ions and the excess hydroxy ions. While this rationale offers a plausible explanation for the improved performance, it was not expected that phenates produced by the process of the present invention would produce such a distinct improvement in engine performance when used as an oil additive.

TABLE IV

Comparison of MWM-B-Test Results
between Product Obtained from
Sulfurization by SCl$_2$ and Sulfurization by Elemental Sulfur

| Blend | MWM-B test results[1] |
| --- | --- |
| Phenate made from elemental sulfur[2] | 61,62 |
| Phenate made from SCl$_2$[3] | 66 |

[1] Merit rating of 65 is good and 55 is poor. Such tests are normally reproducible to within about 1-2 merit rating units.
[2] Prepared as in Example IV.
[3] Prepared as in Example I.

Although specific embodiments of the invention have been described in detail, it should be understood that the invention is to be given the broadest possible interpretation within the terms of the following claims.

What is claimed is:

1. An improved process for the preparation of sulfurized overbased alkaline earth metal phenates comprising the following steps:
   (a) sulfurizing an alkylphenol with a sulfur halide in an alkane solvent having from about 6 to about 10 carbon atoms;
   (b) neutralizing the sulfurized alkylphenol with an alkaline earth metal compound in a mixed solvent comprising said alkane and an alkanol having from 1 to about 3 carbon atoms to produce a sulfurized alkaline earth metal phenate;
   (c) carbonating said phenate in the mixed solvent of (b) with carbon dioxide to produce an overbased phenate in a reaction mixture; and
   (d) filtering and solvent stripping said reaction mixture to recover the phenate product.

2. A process in accordance with claim 1 wherein said alkylphenol contains at least one alkyl group having from about 7 to about 20 carbon atoms.

3. A process in accordance with claim 2 wherein said alkylphenol comprises dodecylphenol.

4. A process in accordance with claim 1 wherein said sulfur halide comprises SCl$_2$.

5. A process in accordance with claim 1 wherein said sulfur halide consists essentially of SCl$_2$.

6. A process in accordance with claim 1 wherein said alkane solvent contains from about 6 to about 10 carbon atoms.

7. A process in accordance with claim 1 wherein said alkaline earth metal compound comprises Ca(OH)$_2$.

8. A process in accordance with claim 1 wherein said alkaline earth metal compound is selected from the group consisting of CaO, Ca(OH)$_2$ and mixtures therefor.

9. A process in accordance with claim 1 wherein said alkaline earth metal compound consists essentially of Ca(OH)$_2$.

10. A process in accordance with claim 1 wherein said alkanol comprises methanol.

11. A process in accordance with claim 1 wherein the molar ratio of alkanol to alkane in the solvents of steps (b) and (c) is in the range of from about 0.1:1 to about 0.8:1.

12. A process in accordance with claim 1 wherein the solvents in steps (a), (b), and (c) are substantially free of alkylene glycols.

13. A process in accordance with claim 1 wherein the molar ratio of said sulfur halide to said alkylphenol in step (a) is in the range of from about 0.1:1 to about 0.9:1.

14. An improved process for the preparation of sulfurized overbased alkaline earth metal phenates, wherein the starting feedstock is selected from the group consisting of alkylphenols, sulfurized and neutralized sulfurized alkylphenates, comprising a step of carbonating a neutralized sulfurized alkyl phenate by contacting with carbon dioxide in a mixed solvent having from about 6 to about 10 carbon atoms comprising an alkane and an alkanol having from 1 to about 3 carbons atoms to produce said sulfurized overbased phenate.

15. A process in accordance with claim 14 wherein said solvent and said feedstock are each substantially free of alkylene glycols.

16. A sulfurized overbased alkaline earth metal phenate prepared by a process comprising the following steps:
   (a) sulfurizing an alkylphenol with a sulfur halide in an alkane solvent;
   (b) neutralizing the sulfurized alkylphenol with an alkaline earth metal compound in a mixed solvent comprising said alkane and an alkanol having 1 to about 3 carbon atoms to produce a sulfurized alkaline earth metal phenate;
   (c) carbonating said phenate in the mixed solvent of (b) with carbon dioxide to produce an overbased phenate in a reaction mixture; and
   (d) filtering and solvent stripping said reaction mixture to recover the phenate product.

17. A sulfurized phenate in accordance with claim 15 containing a substantial proportion of monosulfide bonds between the alkylphenol molecules.

18. A sulfurized overbased alkaline earth metal phenate product in accordance with claim 16 wherein sulfurization is at least 90 percent complete and said product is substantially free of alkylene glycols and residues thereof.

19. A sulfurized phenate product in accordance with claim 17 wherein said sulfurization is at least about 95 percent complete.

20. A lubricating oil composition comprising a major amount of a lubricating oil and a minor amount of an overbased detergent dispersant additive comprising a sulfurized overbased alkaline earth metal phenate prepared by a process comprising the following steps:
   (a) sulfurizing an alkylphenol with a sulfur halide in an alkane solvent having from about 6 to about 10 carbon atoms;
   (b) neutralizing the sulfurized alkylphenol with an alkaline earth metal compound in a mixed solvent comprising said alkane and an alkanol having from 1 to about 3 carbon atoms to produce a sulfurized alkaline earth metal phenate;
   (c) carbonating said phenate in the mixed solvent of (b) with carbon dioxide to produce an overbased phenate in a reaction mixture; and
   (d) filtering and solvent stripping said reaction mixture to recover the phenate product 21. A lubricating oil composition in accordance with claim 20 containing an amount of said additive in the range of from about 1 to about 4 weight percent.

22. A lubricating oil composition in accordance with claim 20 wherein the dispersant component of said additive consists essentially of said sulfurized overbased alkaline earth metal phenate.

23. A process in accordance with claim 1 wherein the solvents in steps (a), (b) and (c) are substantially free of sulfonates.

24. A process in accordance with claim 14 wherein the starting feedstock and said solvent are each substantially free of sulfonates.

* * * * *